United States Patent [19]

Dessau et al.

[11] 4,438,215

[45] Mar. 20, 1984

[54] ACTIVITY ENHANCEMENT OF HIGH SILICA ZEOLITES

[75] Inventors: Ralph M. Dessau, Edison; George T. Kerr, Lawrenceville, both of N.J.

[73] Assignee: Mobil Oil Corporation, New York, N.Y.

[21] Appl. No.: 319,175

[22] Filed: Nov. 9, 1981

[51] Int. Cl.$^3$ ............................................. B01J 29/28
[52] U.S. Cl. ....................................... 502/71; 502/77; 423/328
[58] Field of Search ........................... 252/455 Z, 442; 423/328

[56] References Cited

U.S. PATENT DOCUMENTS

| | | | |
|---|---|---|---|
| 3,354,078 | 11/1967 | Miale et al. | 208/120 |
| 3,455,842 | 7/1969 | Cornelius et al. | 252/455 Z |
| 3,644,220 | 2/1972 | Kearby | 252/442 |
| 4,305,808 | 12/1981 | Bowes et al. | 252/455 Z |

*Primary Examiner*—Carl F. Dees
*Attorney, Agent, or Firm*—Alexander J. McKillop; Michael G. Gilman; Dennis P. Santini

[57] ABSTRACT

A method for enhancing the activity of high silica zeolites, i.e. having a silica-to-alumina ratio greater than 100 which have been synthesized from a reaction mixture containing tetraalkylammonium ions is disclosed which involves calcining the as synthesized zeolites, treatment of the same with aluminum chloride, followed by hydrolysis and calcination in order to obtain materials having an enhanced activity.

8 Claims, No Drawings

ACTIVITY ENHANCEMENT OF HIGH SILICA ZEOLITES

BACKGROUND OF THE INVENTION

This invention relates to a method of enhancing the acid activity of certain high silica-containing crystalline materials by a process which involves contacting them with aluminum chloride ($AlCl_3$) vapors, followed by hydrolysis and calcination.

High silica-containing zeolites are well known in the art, and it is generally accepted that the ion exchange capacity of a crystalline alumino-silicate is directly dependent upon its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum have many important properties and characteristics and a high degree of structural stability such that they have become candidates for use in various processes including catalytic processes. Materials of this type are known in the art and include high silica-containing aluminosilicates such as ZSM-5 (U.S. Pat. No. 3,702,886), ZSM-11 (U.S. Pat. No. 3,709,979), and zeolite ZSM-12 (U.S. Pat. No. 3,832,449) to mention a few.

The silica-to-alumina ratio of a given zeolite is often variable; for example, zeolite X can be synthesized with silica-to-alumina ratio of from 2 to 3; zeolite Y from 3 to about 6. In some zeolites, the upper limit of silica-to-alumina ratio was virtually unbounded. ZSM-5 is one such example wherein the silica-to-alumina ratio is at least 5. U.S. Pat. No. 3,941,871 discloses a crystalline metal organosilicate essentially free of aluminum and exhibiting an x-ray diffraction pattern characteristic of ZSM-5 type aluminosilicates. U.S. Pat. Nos. 4,061,724; 4,073,865; and 4,104,294 describe microporous crystalline silicas or organosilicates wherein the aluminum content present is at impurity levels.

Because of the extremely low aluminum content of these silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The novel process of this invention permits the preparation of certain high silica-containing materials which have all the desirable properties inherently possessed by such high silica materials and, yet, have an acid activity which heretofore has only been possible to be achieved by materials having a higher aluminum content in their "as synthesized" form.

DESCRIPTION OF THE PRIOR ART

It is to be immediately understood that there are patents relating to contacting crystalline aluminosilicate zeolites with aluminum chloride followed by hydrolysis, i.e. U.S. Pat. Nos. 3,354,078 and 3,644,220. However, neither of these two patents is in any way concerned with treatment of crystalline materials having a silica to alumina ratio of at least 100 and even more desirably of at least 500 which have been synthesized from a forming solution containing quaternary ammonium cations. The novel process of this invention results in introducing the aluminum within the intracrystalline structure such that its constraint index is substantially unaltered.

DESCRIPTION OF PREFERRED EMBODIMENTS

As has heretofore been stated, the novel process of this invention is concerned with the treatment of high silica-containing crystalline material. The expression "high silica-containing crystalline material" is intended to define a crystalline structure which has a silica-to-alumina ratio greater than 100 and more preferably greater than 500, up to and including those highly siliceous materials where the silica-to-alumina ratio is infinity or as reasonably close to infinity as practically possible. This latter group of highly siliceous mateials is exemplified by U.S. Pat. Nos. 3,941,871; 4,061,724; 4,073,865; 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or alumina associated therewith, such as boron, iron and chromium, etc. Thus, the only requirements with regard to the starting materials utilized in the novel process of this invention is that they have a silica to alumina ratio greater than about 100 (irrespective of what other materials or metals are present in the crystal structure) and that they be synthesized from a reaction mixture containing tetraalkylammonium ions. It has been found that the novel process of this invention is not applicable to high silica-containing crystalline materials which have been synthesized with diamines.

The novel process of this invention is simple nature and easy to carry out, although the results therefrom are dramatic. The novel process of this invention is carried out simply by calcining a high silica crystalline material having a silica to alumina ratio of at least 100 and preferably of at least 500 which has been prepared from a reaction mixture containing tetraalkylammonium ions by heating the same at a temperature within the range of about 200°–600° C. in an atmosphere such as air, nitrogen, etc. and at atmospheric, superatmospheric, or subatmospheric pressures for between 1 and about 48 hours. The calcined zeolite is thereafter treated with aluminum chloride vapors, preferably admixed with an inert gas such as nitrogen at a temperature ranging from 100° to 600° C. The amount of aluminum chloride vapor which is utilized is not narrowly critical but usually 0.01 to 1 gram and preferably about 0.5 of aluminum chloride is used per gram of high silica crystalline material. Following the treatment with aluminum chloride, the crystalline material is then hydrolyzed in water at a temperature ranging from 20° to 100° C., followed by a final calcination at a temperature ranging from 200° to 600° C., although temperatures of about 450° to 550° C. are preferred.

The activity enhanced high silica-containing crystalline materials prepared by the present process are useful as catalyst components for acid catalyzed hydrocarbon conversion reactions. Such reactions include, as a non-limiting example, cracking of hydrocarbon compounds under reaction conditions including a temperature of from about 300° C. to about 650° C., a pressure of from about atmospheric to about 200 psig and a weight hourly space velocity of from about 0.5 to about 50 hr$^{-1}$.

In practicing a particularly desired chemical conversion process, it may be useful to incorporate the above-described activity enhanced crystalline zeolite with a matrix comprising another material resistant to the temperature and other conditions employed in the process. Such matrix material is useful as a binder and imparts greater resistance to the catalyst for the severe temperature, pressure and reactant feed stream velocity conditions encountered in many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and inorganic oxide gel matrix, on an anhydrous basis, may vary widely with the zeolite content ranging from between about 1 to about 99 percent by weight and more usually in the range of about 5 to about 80 percent by weight of the dry composite.

EXAMPLE

Four different high silica containing zeolites were used in this example—all of which were synthesized from reaction mixtures containing tetraalkylammonium ions. These included three crystalline materials having the x-ray diffraction pattern of ZSM-5, having silica-to-alumina ratios of 600, 2900 and greater than 50,000 respectively. One sample of a crystalline material having the x-ray diffraction pattern of ZSM-11 and having a silica-to-alumina ratio of about 1,056 was also utilized.

The above as synthesized zeolites were calcined in either air or nitrogen at 1° C. per minute to about 540° C. where the temperature was maintained for about 10 hours. Two grams of each of the calcined zeolites were placed in a horizontal tube on one side of a fritted disc and one gram of aluminum chloride was placed on the other side. Dry nitrogen at 50-100 cc per minute was introduced from the direction of the zeolite while heating at 100° C. for one hour. The direction of the nitrogen flow was then reversed and the temperature raised to 500° C. at 2° C. per minute and maintained at 500° C. for ½ hour. After cooling, the zeolite was transferred to another reactor and again heated to 500° C. in nitrogen to remove any residual unreacted aluminum chloride.

Each of the four zeolites was then hydrolyzed at 100 ml of water at room temperature for at least two hours. The hydrolyzed samples were filtered, washed well with water, air-dried, and then finally calcined at 540° C. for ten hours.

The results obtained, as well as the properties of the aluminum enhanced zeolites are shown in the following table:

TABLE

Properties of Aluminum-Enhanced Zeolites

| Zeolite Type | ZSM-5 | ZSM-5 | ZSM-5 | ZSM-11 |
|---|---|---|---|---|
| Si/Al$_2$ | 600 | 2900 | ~50,000 | 1056 |
| % Al (orig.) | 0.15% | 0.03% | <0.01% | <0.1% |
| % Al (after treatment) | 2.55% | 1.63% | 1.55% | 1.93% |
| % Crystallinity (after treatment) | n.d. | n.d. | 74% | n.d. |
| Alpha (orig. in H-form) | 17 (est.) | 4 (est.) | 0.004 | 10 (est.) |
| Alpha (after treatment) | 102 | 75 | 70 | 101 |
| Increase in Alpha | 85 | 71 | 70 | 91 |
| Constraint Index (after treatment) | n.d. | n.d. | 4.1 | 4.8 |

As can be seen, the alpha value of each of the four zeolites was considerably raised in accordance with the novel process of this invention. Furthermore, this enhanced acid activity was clearly intrazeolitic as evidenced by the shape selective constraint index values.

As is well known in the art, the alpha activity gives an approximate indication of the catalytic cracking activity of the catalyst compared to a standard catalyst and it gives the relative rate constant (rate of normal hexane conversion per volume of oxide composition per unit time). It is based on the activity of the highly active silica alumina cracking catalyst taken as an alpha of 1. This test is described in U.S. Pat. No. 3,354,078 and in *The Journal of Catalysis*, Vol. 4, pp. 522-529, August 1965.

The constraint index is a measure of the selectivity of a particular catalyst and it involves conversion of normal hexane and 3-methylpentane. This test is described in many issued United States patents, including U.S. Pat. No. 4,231,899.

What is claimed is:

1. A method for enhancing the acid activity of a high silica crystalline zeolite material having a silica-to-alumina mole ratio greater than 100 wherein said crystalline material has been synthesized from a reaction mixture containing tetraalkylammonium ions which comprises calcining said as synthesized crystalline material at a temperature of from about 200° C. to about 600° C. for a period of time ranging from about 1 to about 48 hours, contacting said calcined crystalline material with aluminum chloride vapor at a temperature of from about 100° C. to about 600° C., hydrolyzing said aluminum chloride contacted crystalline material by contacting the same with water and calcining said hydrolyzed crystalline material in order to obtain a crystalline material having an enhanced acid activity.

2. The method of claim 1 wherein said crystalline material has a silica-to-alumina mole ratio greater than 500.

3. The method of claim 2 wherein said crystalline material has the structure of ZSM-5.

4. The method of claim 2 wherein said crystalline material has the structure of ZSM-11.

5. A crystalline zeolite material having enhanced activity prepared by the method of claim 1, 2, 3 or 4.

6. A catalyst composition comprising a matrix material and a crystalline zeolite material of claim 5.

7. A method for enhancing the acid activity of a high silica crystalline zeolite material having the crystal structure of zeolite ZSM-5 and a silica-to-alumina mole ratio greater than 100 which comprises calcining said crystalline material at a temperature of from about 200° C. to about 600° C., contacting said calcined crystalline material with aluminum chloride vapor at a temperature of from about 100° C. to about 600° C., hydrolyzing said aluminum chloride contacted crystalline material and calcining said hydrolyzed crystalline material.

8. A method for enhancing the acid activity of a high silica crystalline zeolite material having the crystal structure of zeolite ZSM-11 and a silica-to-alumina mole ratio greater than 100 which comprises calcining said crystalline material at a temperature of from about 200° C. to about 600° C., contacting said calcined crystalline material with aluminum chloride vapor at a temperature of from about 100° C. to about 600° C., hydrolyzing said aluminum chloride contacted crystalline material and calcining said hydrolyzed crystalline material.

* * * * *